Dec. 6, 1949 C. W. EARP 2,490,039
ARRANGEMENT FOR SELECTION AND DEMODULATION
OF ELECTRICAL PULSES
Filed Jan. 16, 1945 10 Sheets-Sheet 1
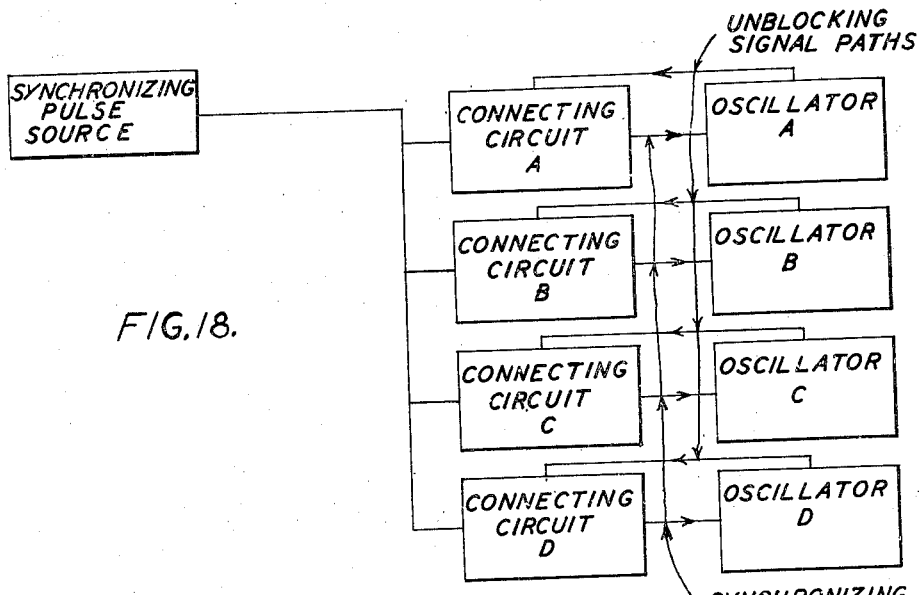
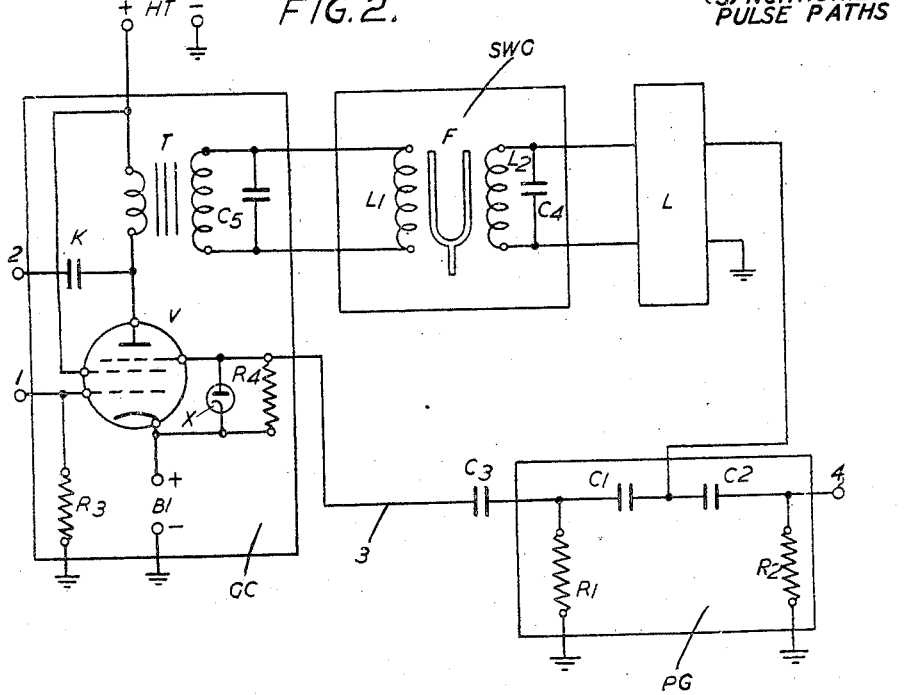
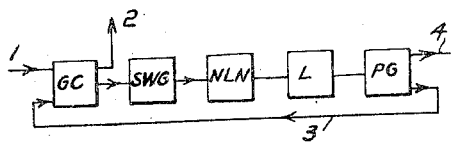
Inventor
CHARLES WILLIAM EARP
By
Edward D. Kinney
Attorney Dec. 6, 1949 C. W. EARP 2,490,039
ARRANGEMENT FOR SELECTION AND DEMODULATION
OF ELECTRICAL PULSES
Filed Jan. 16, 1945 10 Sheets-Sheet 8

Inventor
CHARLES WILLIAM EARP
By
Edward D. Kinney
Attorney

Dec. 6, 1949   C. W. EARP   2,490,039
ARRANGEMENT FOR SELECTION AND DEMODULATION
OF ELECTRICAL PULSES
Filed Jan. 16, 1945

Inventor
CHARLES WILLIAM EARP
By
Edward D. Phinney
Attorney

Patented Dec. 6, 1949

2,490,039

UNITED STATES PATENT OFFICE 2,490,039

ARRANGEMENT FOR SELECTION AND DEMODULATION OF ELECTRICAL PULSES

Charles William Earp, London, England, assignor, by mesne assignments, to International Standard Electric Corporation, New York, N. Y., a corporation of Delaware Application January 16, 1945, Serial No. 573,102
In Great Britain November 26, 1943

Section 1, Public Law 690, August 8, 1946
Patent expires November 26, 1963

13 Claims. (Cl. 179—15)

The present invention relates to electrical pulse receiving systems, and is primarily concerned with arrangements for selecting a particular desired pulse train in a received signal to the exclusion of other pulse trains and interference.

As a subsidiary or incidental feature the invention may include arrangements for frequency sub-dividing a pulse train. In some embodiments means may be included for extracting the modulating signal from the pulses.

The arrangement of the invention is one which includes an electrical gate circuit adapted to be opened to accept the desired pulses only when each pulse is due to appear, thus excluding all other pulses and interference. The opening of the gate is determined by the pulses which have already passed through, which pulses are arranged to control the generation of other pulses employed to open the gate. A number of practical difficulties have been found in the working of this system which it is the principal object of the invention to overcome. These difficulties are principally associated with preventing small drifts or variations in the operation from causing the circuit to get out of step with the incoming pulses, and also with preventing a continuous hunting of the control arrangements. These difficulties will be explained when the various means for overcoming them are described.

According to the invention, there is provided an arrangement for selecting a train of regularly repeated electrical signal pulses, comprising means to apply the pulses to a gating circuit, means to produce the sinusoidal wave, means to derive gating pulses from the sinusoidal wave, means to apply the gating pulses to open the gating circuit for the admission of signal pulses when they are due to arrive, and means controlled by pulses which have passed through the gate, to synchronise the sinusoidal wave with the selected pulse train.

The invention also provides an arrangement for selecting a particular train of regularly repeated electrical signal pulses from an incoming signal including other pulse trains and interference, comprising an electrical gating circuit open to admit all incoming signals, means synchronised by the said signal pulses for producing a sinusoidal wave, means controlled by the sinusoidal wave for generating gating pulses, and means for applying the gating pulses to shut the gating circuit to exclude all signals except the particular pulse train.

The invention further covers an electrical pulse train frequency divider comprising means to generate a sinusoidal wave having a frequency substantially equal to the $n$th submultiple of the repetition frequency of a selected incoming pulse train, where $n$ is an integer, means to derive from the said wave gating pulses adapted to control a gating circuit in such manner as to admit only every $n$th incoming pulse, and means to apply the admitted pulses to synchronise the sinusoidal wave.

The invention also consists in a receiving arrangement for an electrical multi-channel pulse signalling system of the kind in which each channel pulse train has the same repetition frequency, at least one of the pulse trains being designated by an identifying tone modulated thereon, comprising means for selecting a pulse train so designated to the exclusion of all others, the said selecting means including a gating circuit, means for generating a sinusoidal wave, means to derive from the said wave gating pulses adapted to open the gating circuit only at the times when the designated pulses are due to arrive, means normally inoperative to synchronise the sinusoidal wave with the designated pulse train, and means controlled by the identifying tone for rendering operative the said synchronising means.

The invention also provides an arrangement for synchronising an oscillation generator comprising a source of regularly repeated electrical synchronising pulses, a circuit normally blocked connecting the source to the generator, means for deriving a train of pulses from the generated oscillations, and means for applying the derived pulses to unblock the said circuit in such a manner as to admit one of the said synchronising pulses during each cycle of the generated oscillations for synchronising the said oscillations.

The invention furthermore provides an arrangement for synchronising a plurality of oscillation generators, comprising one or more communication channels connecting the said generators, a source of regularly repeated electrical synchronising pulses connected to the channel or channels, a plurality of corresponding normally blocked circuits respectively connecting the generators to the channel or channels, means at each generator for deriving a train of pulses from the oscillations generated thereat, and means at each generator for applying the derived pulses to unblock the corresponding connecting circuit in such manner as to admit one of the said synchronising pulses during each cycle of the generated oscillations, for synchronising the said oscillations.

The invention will be illustrated and explained in terms of a number of embodiments with reference to the accompanying drawings in which Fig. 1 shows a block schematic circuit diagram to show the basic arrangement of the embodiments of the invention.

Fig. 2 shows a schematic circuit diagram of a simple embodiment employing a selective filter for selecting the fundamental component of the incoming pulse train, and employing only one gating valve;

Fig. 18 shows a block diagram of an arrangement for synchronizing a number of oscillators from different pulse trains on the same carrier.

Figure 3:
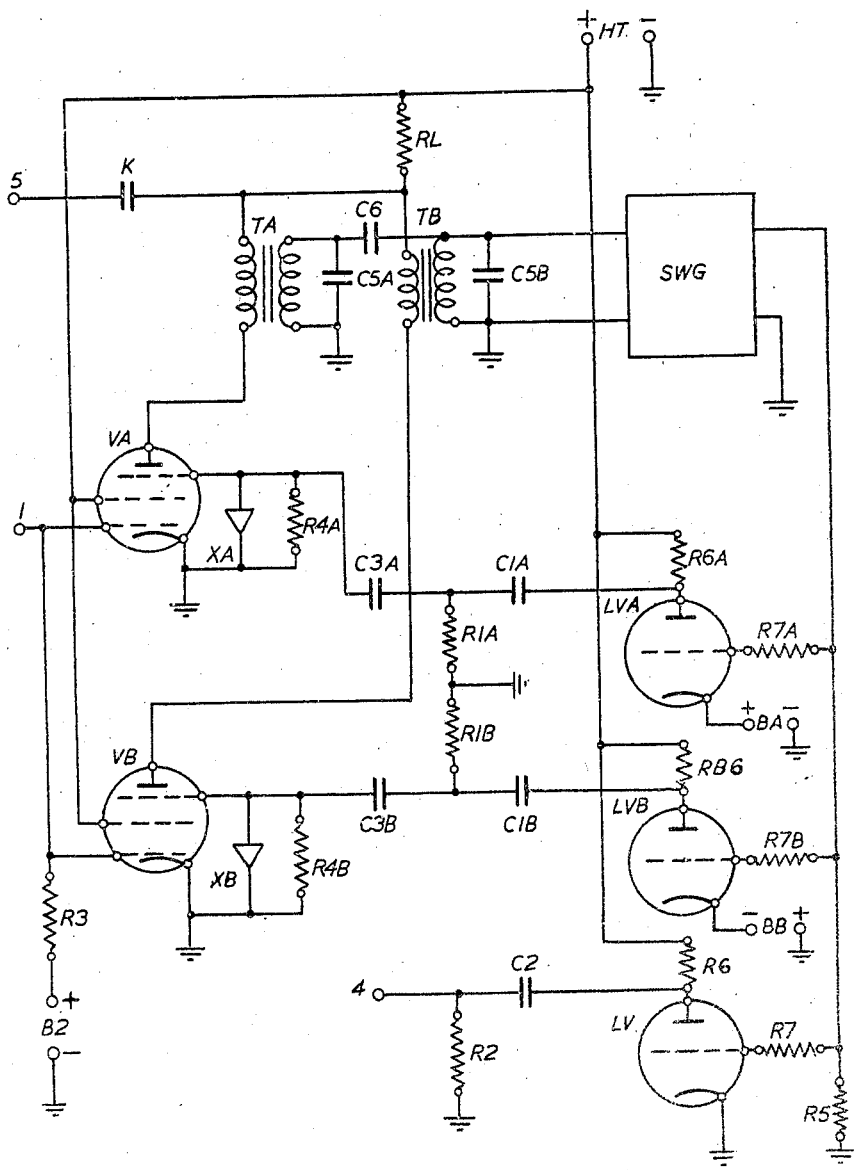
Fig. 3 shows a less simple but more satisfactory arrangement employing two gating valves.

Fig. 1 shows the basic circuit arrangement for selecting a particular pulse train from a mixed incoming signal which arrives over conductor 1. The signal is supposed to include a number of trains of pulses of various repetition frequencies from which it is desired to select one particular train, and there may also be other kinds of interfering signals. The pulses may be simple unidirectional pulses, or packets or bundles of high frequency waves. They are first applied to a gating circuit GC which is adapted to be opened only when each of the desired pulses is due to arrive. The pulses which pass the gating circuit are applied to a device designated SWG and designed to produce a sine wave output at a frequency which is substantially the same as the repetition frequency of the received pulse train, either directly from the pulses applied thereto, or under control of these pulses.

The sine waves obtained from the output of SWG may now be applied to a non-linear network NLN adapted to produce a phase change depending on the amplitude of the sine waves; this network is only necessary in certain of the embodiments of the invention and its purpose will be explained in detail later. The sine waves then pass to a limiter L adapted to produce substantially rectangular waves from the sine waves. These rectangular waves are then applied to a pulse generator PG adapted to produce short gating pulses similar in character to the input pulses applied at 1. These gating pulses are fed back to the gating circuit GC and operate to open it at the right times for the incoming pulses. The pulses after having passed the gating circuit may be supplied at 2 to suitable apparatus (not shown) in which they may be demodulated or otherwise treated. Output pulses may also be obtained from other parts of the circuit, such as from the output of the pulse generator PG at 4.

In the detailed circuits which will be described below, the blocks shown in Fig. 1 will not always be separately identifiable since two or more functions may be combined in the same apparatus. Fig. 1 does however exhibit the main features of the arrangement of the invention.

In the description which follows, some of the difficulties associated with the proper operation of the system will be explained. It will be seen that the gate through which the pulses pass is opened under the control of those which have already passed through and accordingly it will be evident that some means must be provided for starting the reception, since as so far described there is no reason why reception of the pulses should start at all.

As will be explained later, the device SWG may take one of two different forms; it may be either a narrow band-pass filter adapted to select the fundamental sine wave component of the pulse train and substantially to suppress all the harmonics, or it may be an oscillator adapted to generate a pure sine wave having a frequency substantially the same as the pulse repetition frequency, the oscillator being synchronised by the pulses which have passed the gate.

Fig. 2 shows details of one arrangement according to the invention. The gating circuit GC comprises a pentode valve V biassed to cut-off by means of a source B1 connecting the cathode to ground. Signals are applied at 1 to the control grid which is connected to earth through the resistance R3. The suppressor grid potential is controlled by the gating pulses from PG so as to unblock the valve at the proper times, as will be presently explained. The anode circuit is coupled to the device SWG through a transformer T of which the secondary winding is tuned by the condenser C5 to the pulse repetition frequency. In this circuit the device SWG is represented by a narrow band-pass electrical wave filter. When the pulse repetition frequency is low, for example 1000 pulses per second, a very convenient form of filter comprises two coils L1 and L2 coupled electromechanically by a steel tuning fork F, tuned to the pulse repetition frequency. As is well known, such an arrangement forms a highly selective filter which will pass with appreciable amplitude only frequencies very close to the natural frequency of the fork. This filter could, however, take any form suitable to the repetition frequency of the pulse train; it could, for example, be a conventional wave filter, or employ a piezo-electric crystal or other resonant system instead of the fork.

The coil L2 is tuned to the pulse repetition frequency by the condenser C4 and is connected to the limiter L designed according to any well known arrangement to convert the sine waves into substantially rectangular waves obtained at its output. It might consist for example of two tandem connected valve stages both of which have a small or zero biassing voltage. Partial squaring of the wave will occur in the first stage and more complete squaring in the second stage. Other stages could be added if necessary. Appropriate amplifiers (not shown) may be inserted before and/or after the device SWG, if they should be required.

The output of the limiter L is connected to the pulse generator PG which consists in this case of a pair of differentiating condenser-resistance circuits C1, R1 and C2, R2 adapted to produce short alternately positive and negative pulses from the square waves in well known manner. The negative pulses produced across R1 have no effect and can be disregarded, but the positive pulses are the gating pulses and are applied through a large condenser C3 to the suppressor grid of the valve V1 which is connected to the cathode by resistance R4 shunted by a rectifier X, shown as a diode, through a selenium or copper oxide or other kind of rectifying device or circuit could be used instead.

The diode is connected with its anode to the suppressor grid of the valve V. If it be assumed that there are no signals applied at 1, the suppressor grid will be maintained substantially at cathode potential, so that the valve is in a condition to accept any signals which may arrive; in other words, the gate is standing open. When signals are applied at 1 (which signals include all the unwanted pulse trains and other interference) the fork filter will select the fundamental sine wave component from the wanted pulses, and the gating pulses will then be supplied to the suppressor grid from PG. On account of the presence of the diode, these pulses build up a negative bias potential on the suppressor grid by charging the condenser C3, so that in the intervals between the gating pulses, the valve is blocked. However, just at the periods of the peaks of these positive pulses the suppressor grid potential is raised substantially to that of the cathode so that the valve is unblocked to admit the wanted pulses.

It will be seen that by this arrangement, the gate is at first standing open, but as soon as any signals including the wanted pulse train are received, the gating pulses cause it to be shut to all but the wanted pulse train.

It will be evident that the gating pulses must be properly timed to unblock the valve at the right moments, and the arrangement must not tend to get out of step. It is for this latter purpose that the network NLN (Fig. 1) (or its equivalent) may be provided.

In Fig. 2 there is no separate representative of NLN, but its function may be carried out in several ways in the apparatus already shown.

Thus, advantage may be taken of the fact that the mean direct magnetic attraction between the fork F and the coils L1 and L2 varies with the amplitude of vibration, and this causes a corresponding slight variation in the natural frequency of the fork. This is accompanied by a variation of the phase of the sine wave output relative to the input pulses. Should the gating pulses tend to drift out of coincidence with the incoming pulses, the driving force on the fork is reduced and its frequency varies slightly, and it is found that this variation is in the right direction to correct the phase of the gating pulses. There is thus no tendency for the gating pulses to wander out of step.

Another method of achieving the same result is to take advantage of the variations in tuning of the circuit L2, C4 due to variations in the saturation of the iron core of L2 as the amplitude varies. This can be arranged to produce a similar correcting phase change in the output sine wave. Alternatively, an additional tuned circuit like L2, C4 (not shown) could be provided to represent NLN, and would operate in the same way.

Still another method is to overbias the first valve stage of the limiter L in such a way that the negative portion of the square wave in the anode circuit is of smaller duration than the positive portion, for weak signals. For stronger signals these portions tend to become more equal in duration. This will evidently vary the timing of the gating pulses generated by PG with respect to the sine wave output from SWG.

The natural state of equilibrium of the system of Fig. 2 corresponds to the condition in which each incoming signal pulse rides on one edge of the corresponding gating pulse. Movement of the steep edge of the gating pulse applies considerable automatic gain control to the valve V so that the signal levels are automatically adjusted so that the desired coincidence of the input and gating pulses is secured.

The components of the circuit C1, R1 can be selected so that the gating pulses are of appropriate duration to unblock the valve V long enough reliably to accept each incoming pulse. Likewise the components C2, R2 can be selected so that suitable pulses are obtained at 4 for any other purpose.

Fig. 3 shows a modification of Fig. 2 in which two gating valves are provided, adapted to be opened at slightly different times, the wanted pulses passing mainly through one or the other according as they are late or early. The gating times tend to drift automatically into coincidence with the times of arrival of the pulses so that they ultimately pass through both the gates.

The two gating valves VA and VB are arranged in the same way as the valve V in Fig. 2, but share a common grid resistance R3 and negative bias source B2. The cathodes could alternatively have been biassed positively. The suppressor grids are connected to the corresponding cathodes through resistance R4A and R4B shunted by rectifiers XA and XB.

The device SWG may be the same as in Fig. 2, though as already mentioned any suitable type of filter could be used instead of a fork. The device SWG obtains its input directly from the transformer TB connected in series with the anode circuit of VB, and through a condenser C6 from the transformer TA connected in series with the anode circuit of VA. This ensures that there is a phase difference of substantially 90° between the fundamental component voltages applied to SWG from the two valves VA and VB, the reason for which will be explained later.

The output of the device SWG feeds in parallel three limiting valves LVA, LVB and LV. These valves share a common grid resistance R5 and have individual resistance R7A, R7B and R7 in series with their control grids. The anodes are respectively connected to the high tension source HT+ through resistances R6A, R6B and R6. As in the case of Fig. 2 appropriate amplifiers (not shown) may be introduced before and/or after the device SWG.

Three differentiating circuits R1A, C1A, R1B, C1B, and R2, C2 for producing short pulses are respectively connected to the anodes of the three limiting valves LVA, LVB and LV; the first two are connected respectively to the suppressor grids of the gating valves VA and VB and the third to an output terminal 4. The cathode of the first limiting valve LVA is biassed slightly positively to earth by the source BA, and that of the second LVB is biassed slightly negatively by the source BB. The cathode of the third limiting valve is connected to earth. The slightly different bias voltages applied to the three limiting valves cause the leading and trailing edges of the square waves respectively produced in their anode circuits to occur at slightly different times. On application of the signals at terminal 1, the two gating valves are at first both open, and pulses get through to start up the fork in the device SWG. For small fork amplitudes, the derived gating pulses are broad and the two trains applied to the gating valves are appreciably staggered apart. As the fork amplitude increases, the gating pulses become shorter and sharper and the pulse trains close up more nearly into coincidence.

The phasing of the driving and output circuit of the fork is so arranged that when the signals first arrive, one series of gating pulses occur slightly before the pulses of the selected incoming train and the other series occur slightly after. The third train of pulses from terminal 4 will be substantially coincident in time with the incoming pulses.

Thus the gating valve VA provides the early gate, and VB the late gate. The connections of the circuit are so poled that for whichever gate the incoming pulses tend to pass the result is to tend to shift the gating trains in such a manner that each of the incoming pulses is more symmetrically placed between the two corresponding gating pulses. The gating pulses close up together as the fork amplitude builds up, and the signal pulses remain securely meshed between the pairs of gating pulses until they are all practically coincident. The train of output pulses from the valve LV then coincides in time substantially with the incoming pulses, and these pulses may be used to open another signal gate by any suitable arrangement (not shown) for selecting the desired pulses, which may then be demodulated or otherwise treated in any other way.

The manner in which the arrangement operates will be more clearly understood by first assuming that the circuit is steadily receiving a train of the desired input pulses. As already stated, the incoming pulses are meshed between the pairs of gating pulses, so that they will pass partly through each of the gating valves, which are opened at slightly different times. Accordingly on account of the condenser C6 which provides a phase difference of 90° between the driving waves derived from the two valves, the resultant driving wave applied to the filter will be advanced in phase by 45° with respect to the wave derived from VB alone. A total retardation of phase of 45° is arranged to be produced in passing through the filter, and through the subsequent circuits terminating in the grids of the limiting valves LVA, LVB and LV. Now suppose that a small drift occurs tending to make the gating pulses a little too late. (Such a drift may occur in the circuit of Fig. 3 or in the incoming pulses themselves.) The pulses now tend to pass rather through VA, since this, being the early gate, is caused to open a little late. A small advance in the phase of the driving wave therefore occurs and this will advance the gating pulses slightly so as to correct the drift.

If the drift should be large enough to make the incoming pulses completely away from the control of the gating pulses so that they are too late or too early to pass through either of the gating valves, then the fork will lose its drive altogether and the amplitude will decrease, thus widening out and spreading apart the pairs of gating pulses, so that the incoming pulses will be eventually picked up again by one of the gating valves. The fork will then receive a drive in such a phase as to close up and sharpen the gating pulses and to shift them so as to mesh the incoming pulses between them in the manner already explained.

A load resistance RL may be connected if desired, as shown, between the positive high tension terminal HT+ and the common point of the primary windings of the two transformers TA and TB. This enables the pulses which have passed through the gates to be obtained at terminal 5 connected to this common point through a blocking condenser K.

Figure 4:
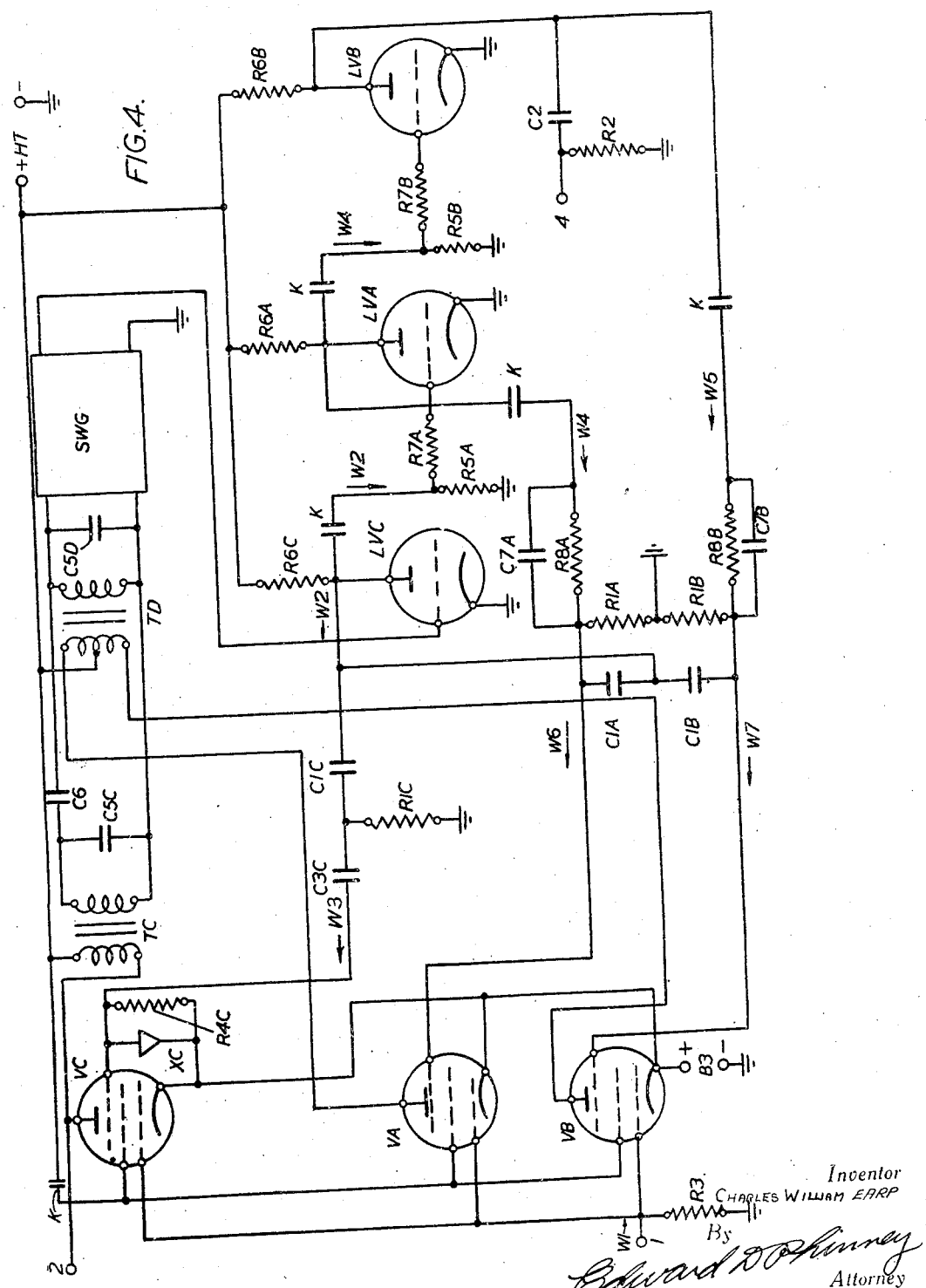
Fig. 4 shows a preferred modification of Fig. 3 employing three gating valves.

In Fig. 4 there is shown a preferred arrangement in many respects similar to Fig. 3, but there are in this case three gating valves, two of which are early and late gates respectively, corresponding to VA and VB of Fig. 3, but which are both initially shut and remain so except when opened by the gating pulses; and the third gate, represented by the valve VC is initially open, but becomes shut as soon as signals arrive, in the manner explained with reference to Fig. 2, being opened periodically by a third train of gating pulses. This may be called the normal gate. When the incoming pulses are being steadily received, they pass through all three of the gates.

The gating valve VC is arranged similarly to Fig. 2, and has its suppressor grid connected to the cathode through a resistance R4C in parallel with a rectifier XC, but the early and late valves VA and VB have no rectifiers. The three cathodes are biassed positively by the source B3 so that the valves are cut off. The three control grids share the grid resistance R3 and are all connected to the input terminal.

The device SWG may be as before, amplifiers (not shown) being provided if necessary. Driving voltage is obtained from the valve VC through a transformer TC tuned with a condenser C5C, and through the condenser C6 as previously used; and also from the transformer TD tuned with the condenser C5D to the primary winding of which are connected the anodes of VA and VB in opposition, anode current for these valves being supplied from the terminal HT+ through the centre point of the primary winding of TD. Thus the voltages derived from VA and VB are advanced and retarded respectively by 90° with respect to the voltage derived from VC.

Three limiting valves are provided in cascade, of which the first, LVC is driven from the output of the device SWG and produces steep trapezoidal waves. These are applied in turn to LVA and LVB where substantially rectangular waves differing in phase by 180° are respectively produced. Pulses derived from LVC by differentiation in the circuit R1C, C1C are applied through condenser C3C to the suppressor grid of VC. Special unblocking pulses are applied to the suppressor grids of VA and VB from LVA and LVB in a manner which will be explained later. Short output pulses may be obtained at terminal 4 from the valve LVB by differentiation in the circuit R2, C2 and may be applied for purposes previously explained. The resistances R6A, R6C are anode supply resistances for the three limiting valves respectively; R5A and R5B are output loads for the valves LVC and LVA respectively, and R7A and R7B are grid series resistances for LVA and LVB.

Figure 5:
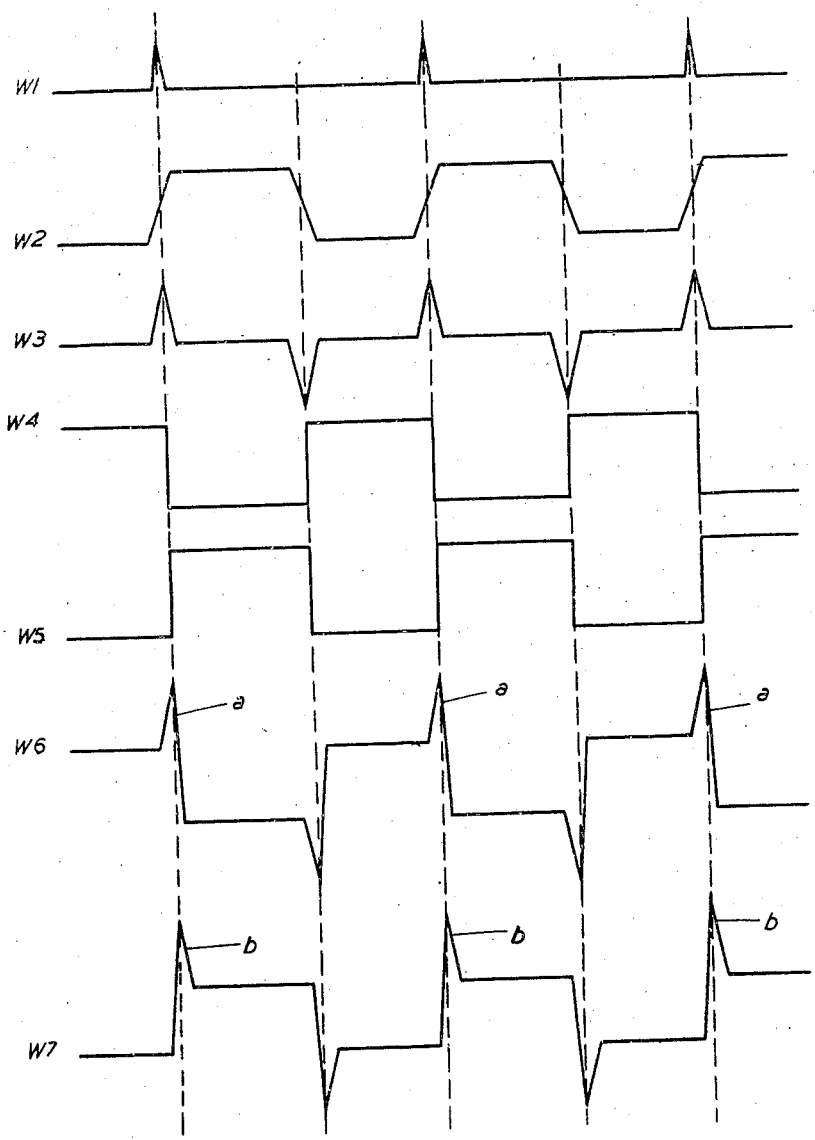
Fig. 5 shows pulse form diagrams used to explain the operation of Fig. 4.

The operation of the circuit will be explained with reference to the diagrammatic wave-forms of Fig. 5. The points at which the various waves occur are designated in Fig. 4 with the corresponding numbers of these curves. The incoming pulses at terminal 1 which it is desired to receive are shown at W1. The trapezoidal waves W2 are obtained from the anode of the first limiting valve LVC from the sine wave output of the device SWG applied to the control grid of this valve. These, after differentiation in the circuit R1C, C1C, become moderately sharp pulses W3, alternately positive and negative, of which the positive pulses are used to unblock the gating valve VC at the tips of the pulses in the manner explained with reference to Fig. 1. It will be understood that these pulses cause the initial blocking of this valve on the first arrival of signals as previously described.

The trapezoidal waves W2 are also applied to the second limiting valve LVA, from the anode of which are obtained practically rectangular waves W4 in opposite phase. These in turn are applied to LVB, and produce from the anode another series of rectangular waves W5 in the same phase as W2. The waves W2 from LVC are also applied in parallel to the two differentiating circuits R1A, C1A and R1B, C1B producing pulses like W3, to which are added waves W4 and W5 respectively after appropriate attenuation by the networks R8A, R1A and R8B, R1B respectively. The resulting waves W6 and W7 are applied to the suppressor grids of the gating valves VA and VB. The waves W6 will be seen to consist of positive peaks $a$ separated by horizontal portions from negative peaks which have no effect and are disregarded. The trailing edges of these peaks $a$ are very steep, but the leading edges are much less steep, being similar to the leading edges of the pulses W3. The waves W7 likewise have positive peaks $b$ corresponding to the peaks $a$ but with the leading edge very steep instead of the trailing edge. The steepness of these edges is enhanced by the condensers C7A and C7B respectively shunting the resistances R8A and R8B.

The valves VA and VB are respectively unblocked by the positive peaks $a$ and $b$. Since the leading edge of $b$ is much steeper than that of $a$, the gating valve VB will be opened later than VA, and so it will be the late gate. Likewise, the gating valve VB will be shut later than VA. The gating pulses W6 and W7 are of course only produced when the fork amplitude has become appreciable.

The stabilising action of the circuit may be considered by supposing that the incoming pulses are being steadily received. These pulses will be passing through VC and also about equally through VA and VB. The component of the driving voltage derived through the transformer TD from these two valves will accordingly be practically zero since the valve anodes are connected in opposition to the primary winding. Practically all the drive therefore comes from the valve VC, and will be advanced in phase by about 90° on account of the condenser C6. If it now be supposed that a drift occurs tending to make the gating pulses W6 and W7 relatively late, the incoming pulses will tend to pass through the early valve VA rather than through the late valve VB, so that a driving component will be contributed through the transformer TD which will bring about a change of phase. The poling of the transformer should therefore be such that in this condition the phase is advanced thereby counter-acting the original drift. The opposite action will then occur if the original drift had been such as to make the gating signals relatively early.

In the circuits of Figs. 2, 3 and 4, although the introduction of amplifiers before and after the device SWG is not essential, it is usually preferable at least to insert an amplifying valve before the device in order that the driving transformer may operate into a substantially infinite impedance. This will prevent the device SWG from placing a load on the transformer which might upset the desired phase adjustments of the circuit.

Figure 6:
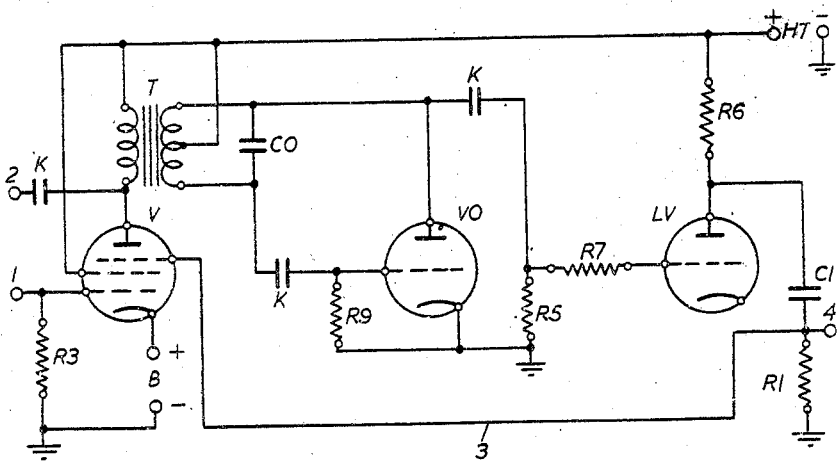
Fig. 6 shows a schematic circuit diagram of a simple arrangement employing an oscillator to generate a sinusoidal wave synchronised by the incoming pulse train, and employing only one gating valve.

Fig. 6 shows an arrangement employing a single gating valve, but differing from Fig. 2 in that the device SWG is an independently oscillating generator which is synchronised by the pulses which it is desired to receive. The circuit does not require any device corresponding to the network NLN shown in Fig. 1.

Referring to Fig. 6, the gating valve B is biassed beyond the cut off of the source B connected to the cathode. The suppressor grid does not in this case require a rectifier, and the gate is initially shut. R3 is the grid resistance across which the incoming pulses are applied. The device SWG comprises a valve VO arranged in a conventional oscillating circuit including the secondary winding of the transformer T tuned closely to the pulse repetition frequency by the condenser CO. R9 is the grid resistance for VO and the condensers K are the usual blocking condensers. The pulses which pass the gating valve are fed through the primary winding of the transformer T to synchronise the oscillations of the valve VO. These oscillations are applied across the output lead resistance to a limiting valve LV which provides nearly rectangular waves which are differentiated in the circuit R1, C1 to form the gating impulses as before. R6 and R7 are the anode and grid series resistances for LV.

The gating pulses are supplied along the conductor 3 to the suppressor grid of the valve V and operate to unblock it just when the incoming pulses are due to arrive.

It is necessary that the oscillation circuit should be tuned to oscillate when uncontrolled at a frequency which is not exactly the same as the pulse repetition frequency, but should be close enough thereto to permit the incoming pulses to exert control. As already explained, the valve V is normally shut, but the free oscillations of the circuit generate pulses which periodically open the valve. When the desired pulse train first arrives, the valve V will in general not be open at the right times to receive the pulses. However, owing to the slight difference in frequency there will be a progressive drift in the relative phases so that presently the incoming signals will be picked up and will pass through the gate. They then synchronise the oscillator so that the proper phase relationship is maintained.

It is to be noted that when the pulses have passed through the gate they will tend to drive the valve VO in quadrature with the oscillations generated thereby. If it be supposed that the tuning of the oscillating circuit is such that there is initially a continuous retardation of phase of the gating pulses with respect to the incoming pulses, then it should be arranged so that the effect of the added controlling wave is to advance the phase of the oscillations, so as to correct the retarding tendency of the gating pulses. This may be done by appropriately poling the connections of the primary winding of the transformer. In this way a stable arrangement is produced.

The pulses which have passed through the gating valve may be obtained from the terminal 2, or alternatively the gating pulses may be taken from terminal 4 and used in any desired manner.

Figure 7:
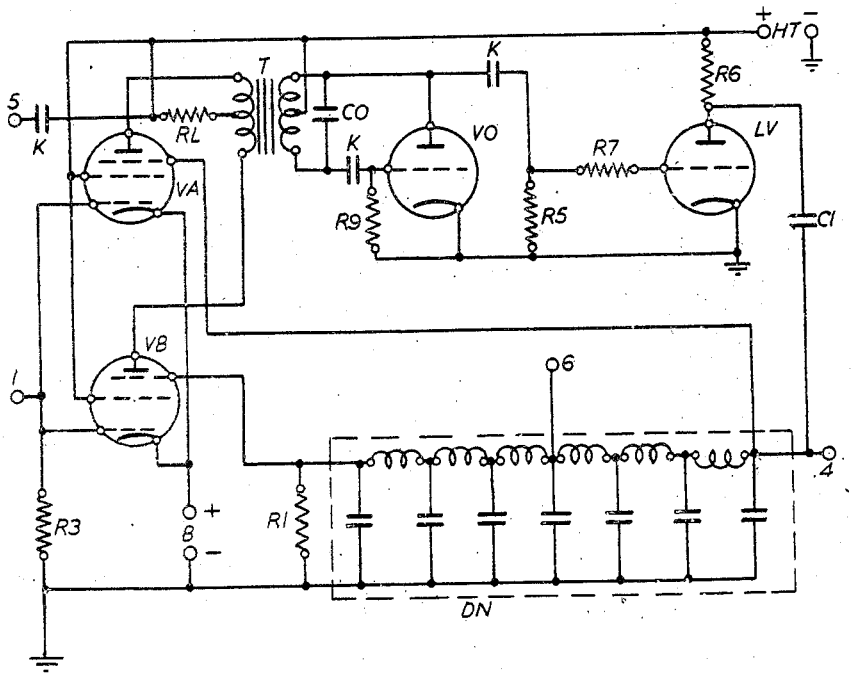
Fig. 7 shows an improvement of Fig. 6 employing two gating valves.

In the arrangement of Fig. 6, it is only possible to correct a continuously retarding or a continuously advancing drift tendency, since it will be clear that the two cases require opposite polings of the primary winding of the transformer T. If it can be assumed that the uncontrolled frequency of the oscillator will remain always slightly higher or always slightly lower than the recurrence frequency of the pulses, such a unidirectional tendency will be maintained. However, small changes in the operating conditions of the circuit may easily upset this condition, and accordingly the modification shown in Fig. 7 is preferable. This is like Fig. 3 in that two gating valves are used providing opposite compensating effects.

The arrangement is similar to Fig. 6 except that the two gating valves have their anodes connected in opposition to the primary winding of the transformer T. Gating pulses are supplied direct from the differentiating circuit to the suppressor grid of VA, but through a delay network DN to that of VB. This delay network should have a characteristic impedance equal to Rl. The valve VA accordingly comprises the early gate and VB the late gate.

If it be supposed that the oscillator has drifted until the incoming pulses pass through VA, then a quadrature drive is applied to the oscillator, and the connections of the primary winding of T should be so arranged that the output phase of the oscillations is advanced. This will tend to make the gating pulses a little earlier so that the incoming pulses will now tend to pass through VB causing in turn a retarding tendency. It will be seen that the arrangement will stabilise so that the incoming pulses are meshed between the two series of gating pulses, and any tendency for a drift in either direction will be automatically counteracted.

Pulses which have passed through the gate can be obtained at terminal 5 connected through a blocking condenser to the load resistance RL connected in series with the anode voltage supply lead for the valves VA and VB and a derived pulse train coincident with the incoming train may be obtained from terminal 6 connected to a centre tap on the network DN.

The oscillator shown for illustration in Figs. 6 and 7 is of a very simple type. It will be evident that various other types could be used provided only that they are capable of control by the incoming pulses in the manner explained. Actually the simple oscillator shown may not be sufficiently stable to allow a given train of pulses to be selected with certainty in the presence of others with closely adjacent repetition frequencies. Therefore a crystal or fork controlled oscillator, for example, having good stability may be more suitable. It may further be desirable to provide a wave filter (not shown) between the gating valves and the oscillator circuit in order to prevent transient phase control of the oscillator.

The arrangements which have been described so far have been sometimes found to exhibit a hunting effect whereby there is a continuous swinging backwards and forwards of the drift correcting operation. Thus any displacement of phase of the gating pulse trains produces an immediate corrective reaction on the waves supplied to the device SWG, whether it be a filter or an oscillator. The response to the corrective reaction is of course not instantaneous, and the corrective reaction persists until the proper phasing has been re-established. At the moment when this occurs, however, the phase of the gating pulses may be changing rapidly and may overshoot the correct value before the reverse correction can take effect. In order to deal with wide ranges of phase change in filters or frequency drift in oscillators, so as to obtain a high precision of coincidence, it is necessary to use large quickly acting corrective forces, and the effect combined with lagging response may produce hunting, or continuous swinging of the control circuits. The circuits to be now described contain means for applying the corrective forces in such manner that they cannot alternate rapidly. There will then be no tendency for the response to lag behind the control, and hunting is therefore prevented.

Figure 8:
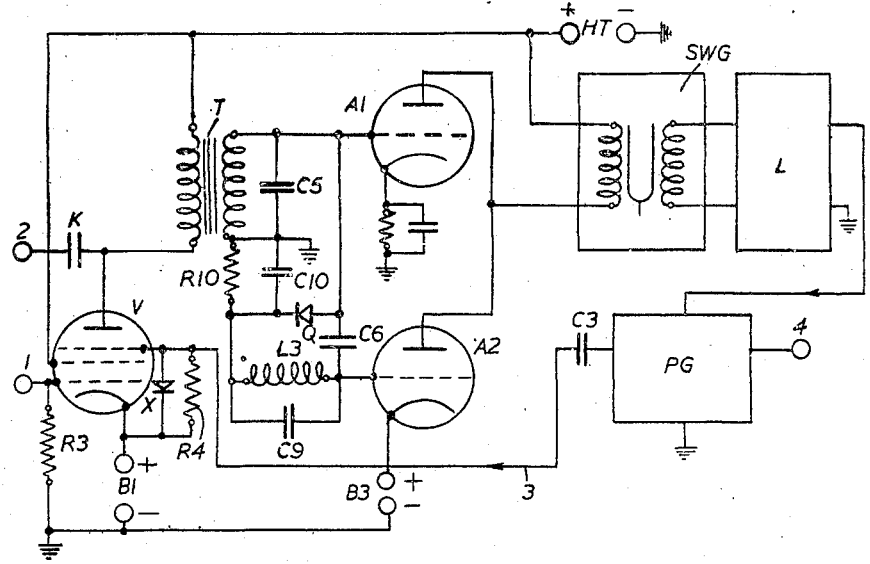
Figs. 8, 9, 11 and 12 show embodiments similar to Figs. 2, 3, 6 and 7 respectively, but with means to prevent hunting of the drift compensating means.

Fig. 8 is a modification of Fig. 2 including means for preventing hunting. Details which have the same designations in the two figures are supposed to be similar and will not be again described. The drive for the device SWG is provided through a pair of amplifying valves A1 and A2 having their anode circuits connected in parallel, the valve A2 being biassed beyond the cut off by the cathode source B3. This valve should preferably be of the variable gain type. A1 is biassed for normal constant amplification by a conventional resistance shunted by a condenser in series with the cathode. Pulses which have passed through the gating valve V are applied directly to the control grid of A1 and also through a small condenser C6 to the control grid of A2 so that the two valves are driven in quadrature.

A rectifier Q, which may be a diode or any other suitable rectifying device, is associated with resistance R10 and condenser C10 to provide a unidirectional bias voltage for the control grid of A2 which is derived from the pulses transmitted through the transformer T. This bias is such as to make the control grid positive, so counteracting the positive cathode bias. The circuit L3, C9 is tuned to the pulse repetition frequency, and is provided to prevent the short circuiting to earth of the control grid for the signal waves.

It will be seen that when control pulses begin to pass the gating valve, the valve A2 is blocked. It becomes eventually unblocked, however, as the positive bias on the control grid builds up, and applies driving waves of increasing amplitude in quadrature with those passed by the amplifier A1 to the device SWG. The resultant driving wave thus advances in phase until equilibrium is reached.

The time taken for this to occur depends on the time constant of the circuit R10, C10, which may be quite large. Any subsequent drift in the gating pulses produces a change in the amplitude of the pulses passed by the transformer T. This change is not immediately effective on the valve A2 owing to the time constant of the circuit R10, C10, but a change in the drive through A2 eventually occurs, changing the phase of the resultant driving wave so that the drift is corrected. Owing to the lag introduced in the application of the correcting force, the circuit cannot hunt.

It will be understood, of course, that the network NLN shown in Fig. 1 is not required in this modification, nor is there intended to be any element in the circuit which performs a similar function. The desired corrective phase change is produced by the valve A2 in the manner explained. Apart from the lag introduced to correct the hunting, the circuit of Fig. 8 operates otherwise similarly to Fig. 2, and equilibrium occurs when each incoming pulse coincides with one edge of the correspondingly gating pulse.

Figure 9:
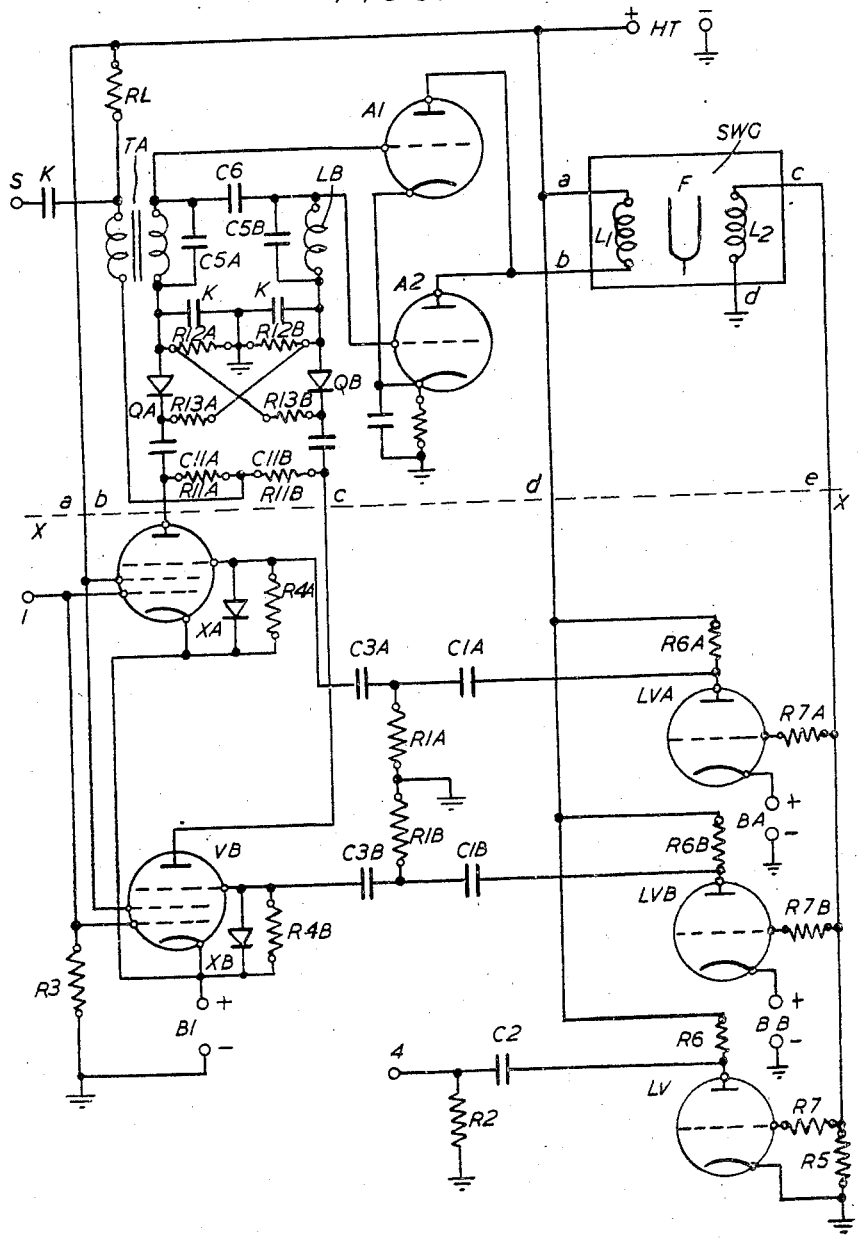

Fig. 9 shows a modification of Fig. 3 introducing means for preventing hunting similar to those described in connection with Fig. 8. Elements which are the same in both figures are similarly designated and will not be again described.

The gating valves VA and VB are connected to the device SWG by a pair of amplifying valves A1 and A2 of variable gain, and by a differential rectifying circuit comprising a pair of similar rectifiers QA and QB of any suitable type, such as diodes. The anodes of the two gating valves are connected together by a pair of equal resistances R11A and R11B, the junction point of which is connected through the primary winding of the transformer TA to the high tension source at HT+ through a load resistance RL. Thus the resistances R11A and R11B form a differential output load for the gating valves and the transformer forms a common load.

The differential rectifier circuit comprises the two rectifiers QA and QB, the resistances R13A and R13B, and the condensers C11A and C11B. This works into a pair of equal load resistances R12A and R12B connected in series, with the common point connected to ground. Each of these load resistances is shunted by a by-pass condenser K.

The amplifier valve A1 is driven direct from the secondary winding of the transformer TA, and A2 is driven in quadrature therefrom through the condenser C6. The cathodes of these valves are biassed by a conventional series resistance and condenser circuit, and the control grids are also variably biassed from the rectifier circuit, according to the manner in which the pulses pass the gating valves. Thus, under normal conditions when equilibrium is established, the pulses will be passing equally through both gates, and the opposed output voltages across the resistances R11A and R11B will be equal, so that no bias voltage will be applied to either control grid.

The valves A1 and A2 will therefore have substantially equal gain. If, however, a drift occurs such that the pulses tend to pass rather through VB, then the rectifier circuit will cause the control grid of A1 to become slightly positive, and that of A2 to become slightly negative, so that the output of A1 will exceed that of A2, thus retarding the phase of the driving force acting on SWG, and so correcting the drift. An opposite drift produces the reverse effect, but as in the case of Fig. 8, the time constant of the rectifier circuit delays the application of the corrective force, thus preventing hunting, as previously explained.

It should be noted that the inductance coil LB corresponds to the transformer TB in Fig. 3, and is tuned to the repetition frequency by the condenser C5B.

Figure 10:
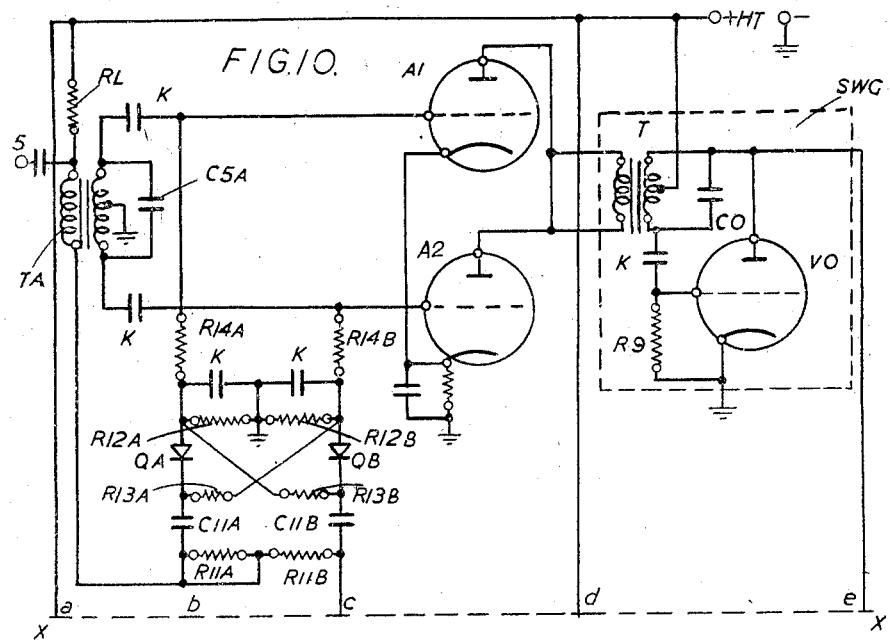
Fig. 10 shows a modification of that part of Fig. 9 above the dotted line X—X, in which an oscillator is used instead of a filter.

Fig. 10 shows a modification of the upper part of Fig. 9, above the dotted line X—X, the leads proceeding downwards in the two figures being identified by the same letters $a$ to $e$. The device SWG is an oscillator instead of a filter. As explained with reference to Fig. 6, when an oscillator is used, the gating valves are initially shut so that the elements XA and XB shown in Fig. 9 are not required and should be omitted when the Fig. 10 modification is employed. An exactly similar rectifying circuit is used, but the valves A1 and A2 are now driven in opposition from the transformer TA. Variable control grid bias is applied from the rectifier circuit through the resistances R14A and R14B. The transformer TA is tuned to the pulse repetition frequency by the condenser C5A as before; the condensers K are blocking condensers.

The oscillating valve VO is arranged in substantially the same way as in Fig. 7, and the anodes of the valves A1 and A2 are connected in parallel to the primary winding of the oscillator transformer T. The output of the device SWG controls the limiting valves in the same way as in Figs. 3 and 9.

When stable equilibrium has been reached, signals pass equally through both the gating valves. There will therefore be no control grid bias potential developed by the rectifying circuit, so that both the valves A1 and A2 will have the same gain, and the output tending to control the oscillations through the transformer T is therefore zero, since the two valves are in opposition. If a drift occurs so that the incoming pulses tend to pass rather through VB than VA, the control grid of A2 becomes slightly positive and that of A1 slightly negative as a result of the reaction of the rectifier circuit, so that a small controlling output will be obtained whose phase is determined by A2. If the pulses tended to pass through VA instead, the phase of the controlling output would have been opposite, as determined by the valve A1.

As already explained in connection with Fig. 7 the phase of the controlling wave is in quadrature with the oscillations generated by the oscillator, and the poling of the transformer T is so chosen that the controlling wave corrects the effect of the drift. The lag produced by the time constant of the rectifier circuit prevents hunting, as before.

Figure 11:
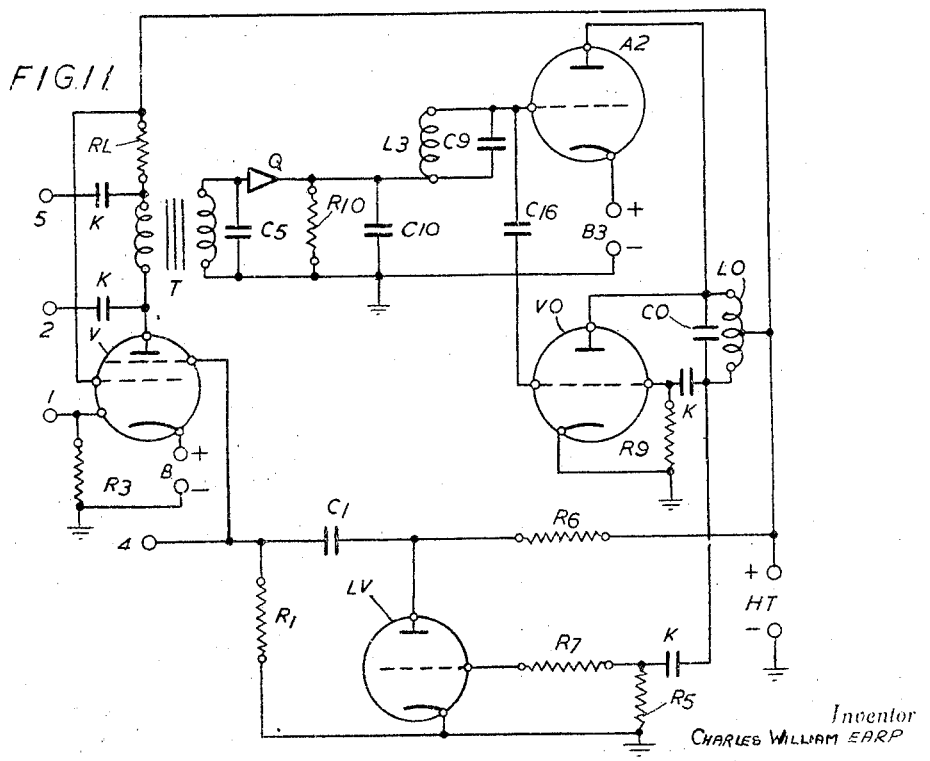

Fig. 11 shows a modification of the arrangement of Fig. 6. In this case the transformer T does not form part of the oscillating circuit, but supplies waves which are rectified by the circuit including the rectifier Q, resistance R10, and condenser C10, to provide a variable positive bias for the control grid of the amplifying valve A2 through the tuned circuit L3, C9. The transformer T and inductance L3 should be tuned by their respective condensers to the pulse repetition frequency as before. These elements will be seen to be arranged in substantially the same way as in Fig. 8. The oscillating valve VO has a conventional oscillating circuit LO, CO associated therewith, tuned near to the repetition frequency of the pulses, and supplies waves to the limiting valve LV exactly as in Fig. 6.

The control grids of the valves A2 and VO are lightly coupled by a small condenser C16 for the purpose of supplying a quadrature input to the amplifying valve from the oscillator. The anodes of these two valves are connected together so that a controlling wave is applied to the oscillation circuit in quadrature with the oscillations.

The amplification of the valve A2 is controlled by the signals which get through the gating valve. Any drift of the gating pulses produces a compensating change through the variation in bias produced by the variation in amplitude of the pulses passing the gate in the manner previously explained, except for the lag produced by the rectifier circuit.

The anode load resistance RL may be inserted as before in series with the primary winding of the transformer T. The received pulses may be obtained if desired from terminal 5 connected to this resistance through a blocking condenser K, or if RL is not provided they may be obtained from the anode at terminal 2 as in Fig. 2, for example.

In certain multi-channel pulse transmission systems a number of pulse trains all having the same repetition frequency are transmitted simultaneously, but are spread out in time so that all the pulses of all the trains occur at different times. Such trains are sometimes separately identified by imposing on each train a different modulating wave, such as a sine wave having a particular frequency designating the train, which may be conveniently called the "identifying tone." Any type of modulation may be used, such as amplitude modulation, duration modulation or time phase modulation, or a combination of such modulations.

The identifying tone may be added to the modulating intelligence wave, for example in the case of a telephone channel, the identifying tone may be sine wave at 50 p:s or any other subaudible frequency. Alternatively, in the case of a pulse distribution system, it may be desired to reserve one channel for identification of phase only, and to use the synchronised receiving system for developing suitable gating or demodulating waves for the other channels.

The arrangement of Fig. 11 may be employed for picking out a particular one of such pulse trains having a given identifying tone. The only modification is that the transformer T and the coil 3 are tuned by their respective condensers to the frequency of the indentifying tone instead of to the repetition frequency of the pulses. Assuming that the valve VO is arranged to oscillate at a slightly lower frequency than the pulse repetition frequency, then the gating pulses first drift continuously so that their phase is retarded with respect to the incoming pulses, until they coincide with them, and amplified pulses then appear in the anode circuit of the gating valve V. If the signal pulses are amplitude or duration modulated, it is evident that the amplified pulses will be similarly modulated. If they are time-phase modulated they will occur at a varying position up and down the trailing edge of the gating pulses. Evidently, therefore, the pulses appearing in the anode circuit of the valve V will in all cases be amplitude modulated with the identifying tone. The modulating component is extracted by the tuned transformer T and is rectified by the circuit Q, R10, C10 as before to control the amplifying valve A2. It will be evident that the amplitude of the modulating tone which appears in the anode circuit of valve V will go through variations similar to those of the amplitude of the pulses as the phase of the gating pulse varies, and the operation of the circuit is the same as previously described, except that the frequency of the controlling wave is that of the identifying tone instead of the pulse repetition frequency. Thus when a number of pulse trains are present all with the same repetition frequency, only that one which has the identifying tone to which the transformer T is tuned can be picked up, since only that particular train is able to operate the amplifying valve A2. The pulses bearing the intelligence modulation which have passed through the gate may be extracted at terminal 5, or the pulses may be received and demodulated in a separate circuit (not shown) controlled by gating pulses from terminal 4, for example.

Figure 12:
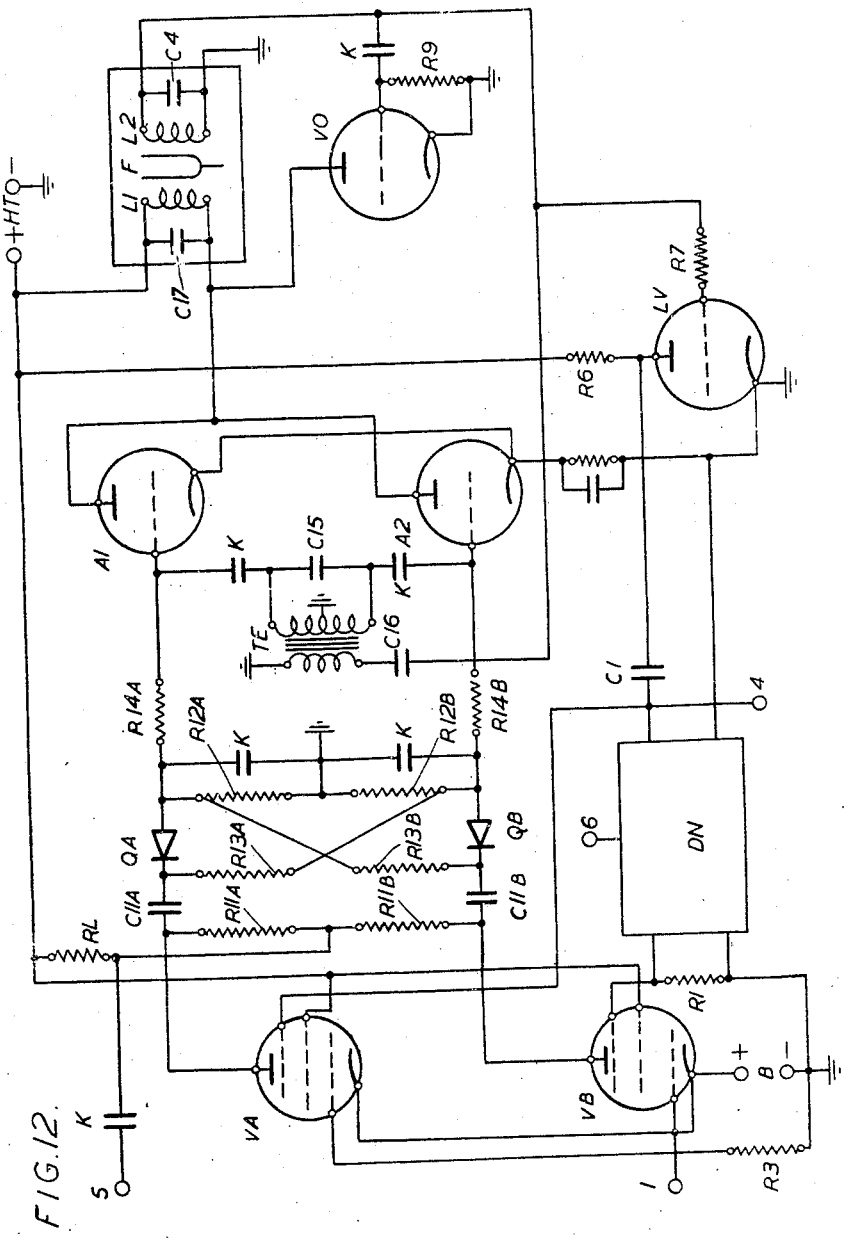

Fig. 12 is a modification of Fig. 7 employing a differential rectifier of the kind described in connection with Fig. 9. A different type of oscillator controlled by a fork has been shown, but any other suitable type could have been used.

The two amplifying valves A1 and A2 have their anodes connected in parallel to the input coil L1 of the oscillation circuit which is tuned to the pulse repetition frequency by the condenser C17. The control grid of the oscillator valve VO is coupled lightly to the control grids of A1 and A2 in opposition through a small condenser C16 in series with the primary winding of a transformer TE of which the secondary winding is tuned to the pulse repetition frequency by the condenser C15. This provides a quadrature drive to these valves from the oscillator. When the pulses are being normally received, the control grid bias of both the valves A1 and A2 will be zero, so they will produce a zero resultant output, and therefore there will be no controlling wave applied to the oscillator. When a drift occurs, the voltages applied by the gating valve to the rectifier circuit will cease to cancel out and the control grids of A1 and A2 will eventually become biassed in opposite directions, thus applying to the oscillator a quadrature controlling wave adapted to correct the drift.

Figure 13:
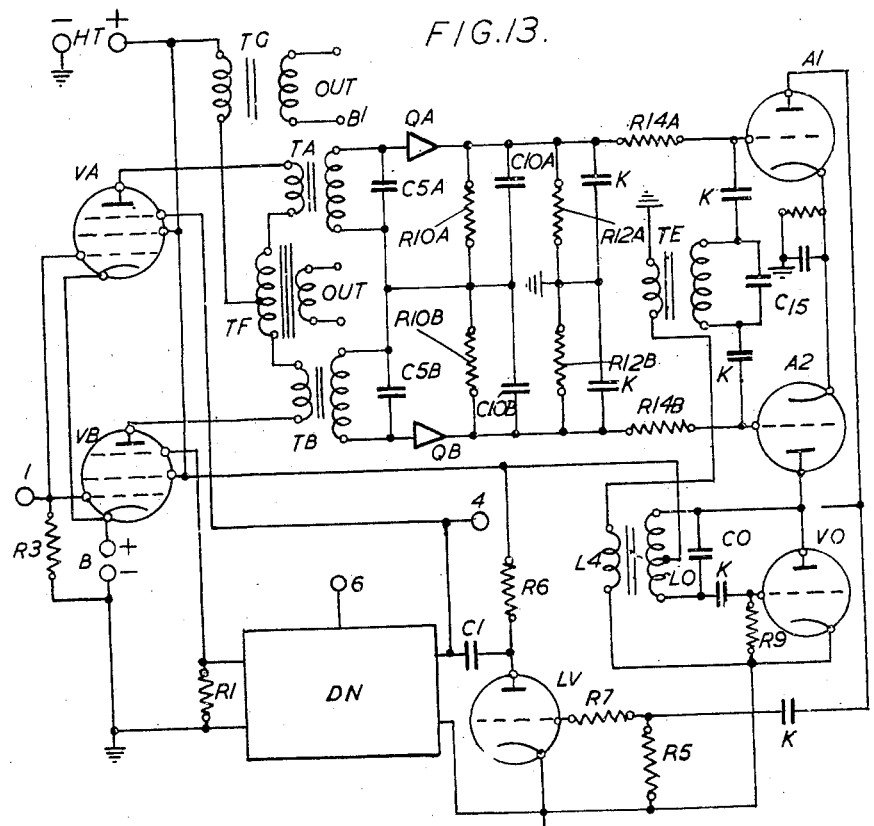
Fig. 13 shows a modification of Fig. 12 adapted to select a pulse train designated by an identifying tone.

Fig. 13 shows an arrangement of similar type to Fig. 12 but adapted to select a pulse train designated by an indicating tone in a multichannel system of the kind described with reference to Fig. 11. It differs from Fig. 12 in that the oscillating circuit associated with the valve VO is of the kind shown in Fig. 11, and is connected to the transformer TE through a winding L4 closely coupled to the winding LO instead of through a condenser such as C16. These differences are immaterial, and the oscillator and coupling arrangement of Fig. 12 could have been used in Fig. 13.

The differential rectifier circuit used in this case for controlling the amplifying waves A1 and A2 comprises substantially two rectifier circuits like that of Fig. 11 arranged in opposition, connected respectively through resistances R14A and R14B to the control grids of valves A1 and A2. The components of these two rectifier circuits are given the same designations as those of the rectifier circuits in Fig. 11 with the addition of the letters A and B respectively. The resistances R12A and R12B, each shunted by a by-pass condenser, provide the grounded centre-tapped load for the pair of rectifiers.

The anodes of the gating valves are connected through the primary windings of the transformers TA and TB to the terminals of the primary winding of a transformer TF, the centre point of which is connected through the primary winding of a transformer TG to the terminal HT+. The secondary winding of transformers TA and TB are tuned to the frequency of the identifying tone by the condensers C5A and C5B and are connected respectively to the input sides of the two rectifiers.

It will be understood from the explanations already given in connection with Figs. 11 and 12 that the gating pulses will drift in phase until the incoming pulse train bearing the identifying tone is picked up, and the identifying tone is then selected by the transformers TA and TB and rectified and applied to the control grids of the valve A1 and A2. So long as the incoming pulses are symmetrically meshed between the two series of gating pulses, the control grid voltages of the two valves A1 and A2 will be equal. If a drift occurs whereby the pulses tend rather to pass through VA and VB, then the grid voltage of A1 is raised and that of A2 is lowered and a corrective force is thereby applied in the manner already explained. Similarly an opposite drift is connected in the reverse manner.

The transformers TF and TG are provided for extracting the modulation from pulses which have passed through the gates. Transformer TF being connected differentially will be used when the pulses are time phase modulated, because in that case the outputs of the two valves will be continually varying in opposition, on account of the modulation. It will be understood that the lag in the rectifier circuit will prevent the gating pulses from following the rapid variation of the time phase modulation.

When the pulses are duration or amplitude modulated, the transformer TG is used, since in that case the outputs of both valves vary in the same direction with the modulation. Clearly, if only one type of modulation is involved, one of the transformers TF or TG will not be wanted and may be omitted.

In all the embodiments which have been described so far, frequency division of the incoming pulse train may be obtained by tuning the filter or oscillator circuit to a subharmonic of the incoming pulse train. The repetition frequency of the gating pulses will then be equal to say 1/$n$th of that of the incoming pulses and the gate or gates, will accordingly be opened to admit only every $n$th pulse of the train. The arrangement then operates as if all the other pulses in the incoming train were absent.

The arrangements which have been described with reference to Figs. 8 to 13 included a rectifier circuit of high time constant for the purpose of introducing a lag for preventing hunting. When other pulse trains have repetition frequencies which are very close to that of the wanted train, or when there is much interference, it is necessary to use a very highly selective filter or very stable oscillator for the device SWG, in order to avoid picking up the wrong pulse train, or to suppress the interference. In either case a tuned circuit or other resonator of very low decrement must be used, such as an electromagnetically driven fork, or a piezoelectric crystal, for example. Such a low decrement resonating system is a predisposing cause to hunting because there is implied a lagging response to the corrective or controlling drive which encourages the hunting.

It has been found that this predisposition to hunting can be greatly minimised by providing a small aperiodic leak across the resonant element. This modifies only imperceptibly the response curve of the element near the resonance point, but provides a small response, free from inertia, to sudden changes of excitation. The effect of a sudden change of drive is to produce a small but instantaneous change of output, which then changes very slowly by a further amount while the resonant element takes up the new steady state. Sufficient leakage should be provided so that an adequate range of quick response is obtained to suppress the hunting.

Figure 14:
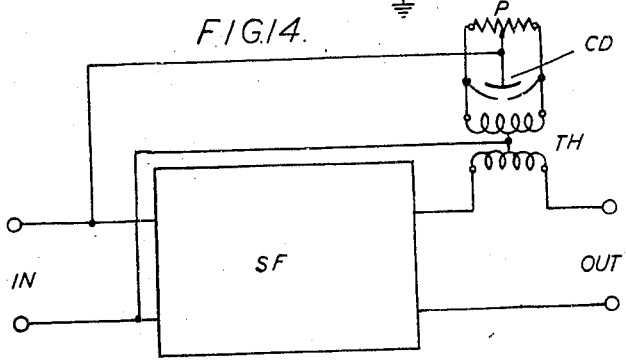
Figs. 14 and 15 show schematic circuit diagrams of two arrangements for by-passing a selective element.

Fig. 14 shows one simple way in which this may be done. In this figure SF is a selective filter element such as an electrically controlled fork arranged, for example, as shown in Fig. 2, or a piezoelectric crystal or any other resonant system of low decrement which would very strongly attenuate waves of all frequencies except those very close to the resonance frequency. Shunted across the input terminals IN of SF is one pair of diagonal terminals of a Wheatstone bridge comprising a centre tapped primary winding of the transformer TH, connected to which in parallel is an adjustable potentiometer P and a differential condenser CD. The secondary winding of TH is connected in series with the output terminals OUT of SF.

If the bridge is balanced, then substantially no effect is produced, but if it be unbalanced slightly by adjustment of P and/or CD a small amount of the input waves having any desired amplitude and phase will be shunted round the element SF. This provides the means for obtaining the desired aperiodic leak which is not affected by the selective action of the element. It will be noted that the bridge is connected in parallel on the input side and in series on the output side. It will be evident that it could be connected in series or in parallel at either end as desired.

It will be understood that in the absence of the bridge circuit there is likely to be a small amount of direct transfer of energy from the input to the output terminals due to capacity or other couplings which cannot always be completely avoided. It is clear, therefore, that the bridge could be adjusted so that such direct transfer is exactly neutralised, and in that case the hunting tendency would be a maximum. Such an exact balance is not desired, and an appropriate unbalance is produced in the following way.

Transfer through the element SF is first prevented in a suitable way (for example, by clamping the fork if the element is of this type, or by an appropriate disconnection in an electrical filter). The potentiometer and condenser are then balanced until a zero resultant leak is obtained. The potentiometer is then displaced in such a direction that the slight resultant leakage produced is in the same phase as the output of the resonant element. The exact balance first made by means of the condenser prevents any quadrature currents passing round the resonant element so that the phase of the output remains constant while it is building up. If the resistance balance also remained exact the automatic phase control circuits of the various embodiments described tend to produce slow phase hunting believed to be due to the exceedingly sharp rate of change of phase with frequency in the neighbourhood of resonance, so that the resonant element introduces a large delay or inertia. By providing a definite small leak in phase with the output of the element the amount of phase change which can be produced by the whole circuit is restricted thus preventing low speed hunting. If the leakage provided is excessive, a fast phase hunting or flutter tends to be produced owing to the loss of selectivity resulting from the excessive leak. Generally, however, an adjustment can be found which greatly reduces any tendency to hunting.

Figure 15:
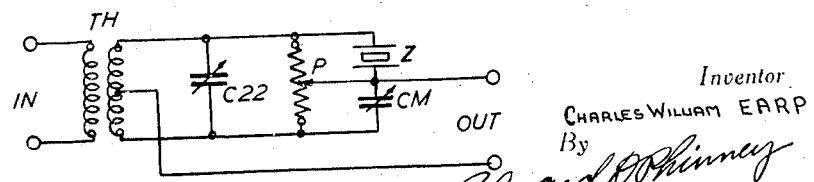

Fig. 15 shows a bridge arrangement employing a piezoelectric crystal to form a selective filter with an aperiodic leak on the same principles as Fig. 14. The bridge comprises the two halves of the secondary winding of the transformer TH tuned by the variable condenser C22 and the two parts of the adjustable potentiometer P one of which is shunted by the crystal Z and the other by adjustable condenser CM. If the bridge is balanced at some frequency remote from the resonance frequency of the crystal, there will be practically no output except near the resonance frequency, at which the crystal effectively short-circuits one arm of the bridge. The aperiodic leak is provided in the manner explained with reference to Fig. 14 by slight adjustment of the potentiometer away from the balance point.

In the case of either Fig. 14 or Fig. 15, condensers (not shown) may be provided, if necessary, across the "in" and "out" terminals to tune the input and output circuits of the device, and the arrangements may be adapted suitably to the nature of the selective element SF. Input and/or output amplifiers (not shown) may be provided if required. By connecting the input and output terminals through an appropriate amplifier, the circuit of Fig. 14 or 15 then forms an oscillator suitable for any of the embodiments described which employ an oscillator as the device SWG instead of a filter, in which the hunting tendency due to the selective element is obviated by the aperiodic leak.

The arrangement of Fig. 14 is particularly effective in the circuit of Fig. 12. In this circuit the fork oscillator cannot easily develop a fast flutter on account of the large time lag introduced by the rectifier circuits. The controlled leak adjusted as described quenches the low frequency hunting swings which could be transmitted through the control circuits.

In the arrangements of Figs. 1 to 13, the range of frequency variation over which synchronisation can be maintained depends on the range of phase control which can be provided, and on the extent of variations of the change of phase through the selective element. The range of control can therefore be extended if the variation of phase change through the element can be eliminate.

Figure 16:
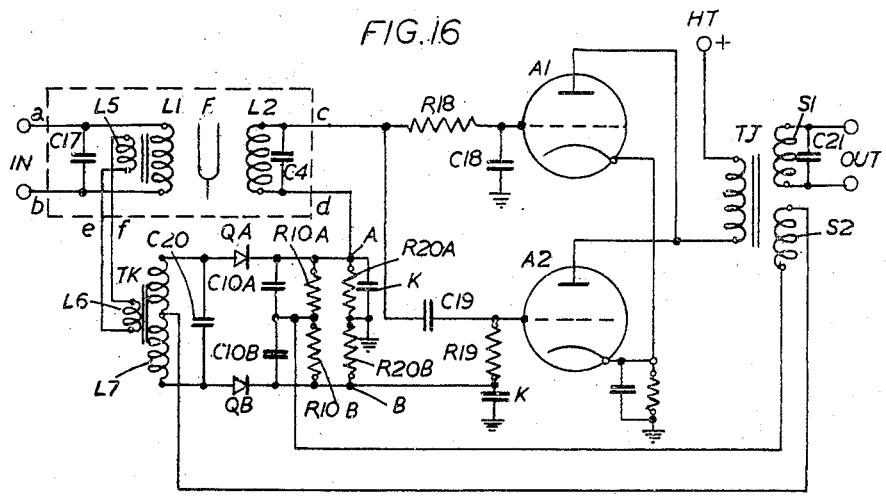
Fig. 16 shows a schematic circuit diagram of an arrangement for compensating the phase change through a selective element.
Figure 17:
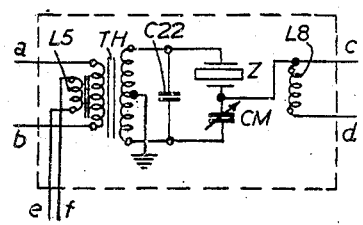
Fig. 17 shows a modification of part of Fig. 16.

Fig. 16 shows an amplifying selective circuit including a fork resonant element which provides the same selectivity as the simple electrically driven fork device SWG of Fig. 2, but without the frequency variation of phase change which is inherent in the simple arrangement. Fig. 17 shows a modification of the part of Fig. 16 enclosed in the dotted lines to enable a piezoelectric crystal circuit of the kind shown in Fig. 15 to be used. The circuit can obviously be suitably modified to employ other types of resonant element without affecting its operation in principle. Corresponding leads leaving the dotted outlines in the two figures are designated with the same small letters a to f.

Referring first to Fig. 16, the dotted outline shows an electrically driven fork F arranged in substantially the same way as shown in Fig. 2 except that a coil L5 is loosely coupled to L1, and an optional condenser C17 is shown to tune the input circuit.

The output of the fork circuit is arranged to drive in parallel the control grids of two variable gain amplifying valves A1 and A2, but by means of the suitably chosen resistances and condensers R18, C18 and R19, C19 the valve A1 is driven with the phase retarded by 45° and A2 with the phase advanced by 45°. The anodes of the two valves are connected in parallel through the primary winding of the output transformer TJ to the positive high tension terminal HT+.

The cathodes of the valves are biassed for normal amplification by means of the conventional condenser-resistance circuit shown, and the control grids derive variable bias from the bridge rectifier circuit comprising the rectifiers QA and QB, resistances R10A and R10B and condensers C10A and C10B arranged substantially as in Fig. 13. Resistances R20A and R20B are load resistances for the bias circuit. Bypass condensers K connected to earth are provided for the two control grid circuits.

The rectifiers QA and QB are driven in opposition from a transformer TK comprising a loosely coupled primary winding 46 connected to L5 and a centre tapped secondary winding L7. They are also driven in parallel from the combined output of the valves A1 and A2 through the connection between the secondary winding S2 of the t transformer TJ and the diagonal points of the bridge rectifier circuit.

The coils L1 and L2, and the transformers TJ and TK are all tuned by their respective associated condensers C17, C4, C21 and C20 to the pulse repetition frequency. When the valves A1 and A2 have equal bias, the voltage across TJ will be in phase with the output from the fork F across the coil L2, and this is in phase with the input voltage at the terminals IN. Thus since the two voltages applied to the rectifier circuit by the transformers TJ and TK are in quadrature, there will be no difference of potential between the points A and B, and the control grids of both valves A1 and A2 will be at the same potential.

Now let it be assumed that the pulse repetition frequency increases slightly. This causes a retardation of the phase of the voltage across TJ so that a greater voltage is applied to QB and to QA. The point B therefore, becomes positive to A, increasing the gain of A2 and decreasing that of A1. This slightly advances the phase of the voltage applied to TJ so that the change is compensated. Evidently the reverse effect would occur if the pulse repetition frequency were to decrease. Thus the output obtained at the terminals OUT connected to the secondary winding of the transformer TJ will be always maintained substantially in phase with the input at the terminals IN irrespective of the phase changes introduced by the fork system as a result of changes in the input frequency. It will be clear that phase correction will occur for any change resulting in a difference between the resonance frequency of the fork and the input frequency.

Similar results will be obtained whatever the nature of the resonant system inside the dotted outline. Thus a filter of the kind shown in Fig. 15 may be used, and could be arranged, for example as shown in Fig. 17, which may be substituted for the circuit in the dotted outline of Fig. 16. A coil L5 is loosely coupled to the transformer TH for supplying the quadrature connection to the transformer TK in Fig. 16, and the inductance coil L8 is provided in the position of L2, but is used as a choke to prevent the output of the crystal filter from being short circuited by the rectifier circuit. The arrangement operates substantially as already explained in connection with Fig. 16.

It will be understood that the circuit of Fig. 16 with any type of resonant element may be used in any of the embodiments Figs. 1 to 13 as the device SWG when it is a filter, or as the oscillating circuit when SWG is an oscillator. An aperiodic leak may further be applied to it in the manner of Fig. 14 or 15, if desired.

It should be mentioned that while the invention has been considered chiefly as a means of selecting a particular pulse train from a mixed incoming signal, it may be alternatively employed primarily as a means of synchronising an oscillation generator. Thus, for example a number of oscillators located at different stations connected by transmission lines, radio links or other communication channels, could be synchronised together by transmitting a train of pulses over the channels as shown in Fig. 18. Referring to Fig. 6, VO might represent the oscillator at one of the stations. It would be provided with suitable output means such as an additional winding (not shown) on the transformer T. The synchronising pulses would be supplied at the terminal 1, and if all the oscillators were arranged in the same way, then the outputs of all of them would be strictly synchronised. It is to be noted that each oscillator could be tuned to any sub-multiple of the synchronising pulse repetition frequency, and they could all be tuned to different submultiples.

It will be evident that any of the other arrangements in which the device SWG is an oscillation generator could be adapted in a similar way for control by a synchronising pulse train.

In the claims which follow, the terms "gating circuit" and "gating pulses" are used for convenience. A "gating circuit" is to be understood to mean a circuit to which the incoming pulses are applied, and which is normally blocked (or may become blocked) so that signals cannot pass, but is periodically unblocked so as to admit only certain pulses. The unblocking is effected by another train of pulses which are called "gating pulses."

What is claimed is:

1. An arrangement for selecting a train of regularly repeated electrical signal pulses, comprising a gating circuit, means for applying the pulses to the gating circuit, means for producing a sinusoidal wave, means for deriving gating pulses from the sinusoidal wave, means for applying the gating pulses to control the gating circuit for the admission of signal pulses when they are due to arrive, means, controlled by pulses which have passed through the gate, for synchronising the sinusoidal wave with the selected pulse train, and compensating means to change the phase of the sinusoidal wave in response to a variation in the amplitude of pulses which have passed the gating circuit, the said variation being caused by a drift of the gating pulses away from time coincidence with the incoming pulses, the said change of phase being such as to cause a time shift of the pulses in a direction opposite to the drift, the said means for producing a sinusoidal wave comprising an oscillation circuit having sharply resonating means, and means associated with the said sharply resonating means for preventing a continuous hunting of the said phase compensating means, and aperiodic means for transferring without change of phase a small proportion of the waves at the input of the said sharply resonating means directly to the output thereof over a by-pass circuit in such a manner that the output waves remain substantially in phase with the input waves irrespective of any small and varying difference between the frequency of the waves and the resonance frequency of the resonating means.

2. A receiving arrangement for an electrical multi-channel pulse signalling system of the kind in which each channel pulse train has the same repetition frequency, at least one of the pulse trains being designated by an identifying tone modulated thereon, comprising means for selecting a pulse train so designated to the exclusion of all others, the said selecting means including a gating circuit, means for generating a sinusoidal wave, means for deriving gating pulses from the said wave and for applying them to control the said gating circuit to admit the designated pulses only at the times when they are due to arrive, means for synchronising the sinusoidal wave, means for rendering the synchronising means normally inoperative, means for demodulating the designated pulses to derive therefrom a synchronising control signal and means for applying the said control signal to render the said synchronising means operative.

3. An arrangement for selecting a train of regularly repeated electrical signal pulses, comprising a gating circuit, means for applying the pulses to the gating circuit, means for producing a sinusoidal wave, means for deriving gating pulses from the sinusoidal wave, means for applying the gating pulses to control the gating circuit for the admission of signal pulses when they are due to arrive, means controlled by pulses which have passed through the gate, for synchronising the sinusoidal wave with the selected pulse train and means for compensating for a tendency for a drift away from coincidence in time between the gating pulses and the incoming selected pulses.

4. An arrangement according to claim 3 in which the said compensating means comprises a device responsive to variations in the amplitude of the pulses which have passed through the gating circuit, which variations result from a drift of the gating pulses, the said responsive device being adapted to produce a corresponding variation in the phase of the gating pulses in such a direction as to correct the drift.

5. An arrangement according to claim 3 in which the said compensating means comprises means to change the phase of the sinusoidal wave in response to a variation in the amplitude of pulses which have passed the gating circuit, the said variation resulting from a drift of the gating pulses, the said change of phase being such as to cause a time shift of the pulses in a direction opposite to the drift.

6. An arrangement according to claim 3 in which the said compensating means comprises means to change the phase of the sinusoidal wave in response to a variation in the amplitude of pulses which have passed the gating circuit, the said variation resulting from a drift of the gating pulses, the said change of phase being such as to cause a time shift of the pulses in a direction opposite to the drift, the said phase changing means comprises means to apply pulses which have passed through the gating circuit to two parallel paths, in phases differing respectively by 90°, and means to apply the combined outputs of the paths to the sinusoidal wave producing means.

7. An arrangement according to claim 3 comprising means for preventing a continuous hunting of the said compensating means.

8. An arrangement according to claim 3 comprising means for preventing a continuous hunting of the said compensating means, said anti-hunting means comprising means for changing the phase of the sinusoidal wave in response to a variation in the amplitude of pulses which have passed the gating circuit, means for delaying the response of the said phase changing means, said delaying means comprising rectifier means for deriving a control voltage in a circuit of high time constant from pulses which have passed through the gating circuit, means to apply the said pulses to two parallel amplifying paths in phases differing respectively by 90°, means to apply the combined outputs of the paths to the sinusoidal wave producing means, and means to apply control voltage to vary differentially the gains of the two amplifying paths.

9. An arrangement for selecting a train of regularly repeated electrical signal pulses, comprising a gating circuit, means for applying the pulses to the gating circuit, means for producing a sinusoidal wave, means for deriving gating pulses from the sinusoidal wave, means for applying the gating pulses to control the gating circuit for the admission of signal pulses when they are due to arrive, means, controlled by pulses which have passed through the gate, for synchronizing the sinusoidal wave with the selected pulse train, said gating circuit comprising two thermionic valves each having two grids, means to apply the said incoming pulses simultaneously to the first grid of each valve, means to apply separately to the second grid of each valve an individual gating pulse train derived from the said sinusoidal wave, corresponding pulses of the said gating pulse trains being spaced slightly apart in time, and means to cause the gating pulses to bias each of the said second grids in such manner as to prevent the passage of signals through the corresponding valve except during the period of occurrence of each of the corresponding gating pulses.

10. An arrangement for selecting a train of regularly repeated electrical signal pulses, comprising a gating circuit, means for applying the pulses to the gating circuit, means for producing a sinusoidal wave, means for deriving gating pulses from the sinusoidal wave, means for applying the gating pulses to control the gating circuit for the admission of signal pulses when they are due to arrive, means, controlled by pulses which have passed through the gate, for synchronizing the sinusoidal wave with the selected pulse train, said gating circuit comprising two thermionic valves each having two grids, means to apply the incoming pulses simultaneously to the first grid of each valve, means to bias and block both the valves in such manner as to prevent any signals from passing through them, and means to apply separately to the second grid of each valve an individual gating pulse train derived from the said sinusoidal waves and adapted periodically to unblock the corresponding valve to permit the passage of signals, corresponding pulses of the said gating pulse trains being spaced slightly apart in time.

11. An arrangement of apparatus for synchronising a plurality of oscillation generators, comprising a plurality of communication channels connecting the said generators, a source of regularly repeated electrical synchronising pulses connected to the channels, a plurality of corresponding circuits respectively connecting the generators to the channels, means for normally blocking said circuits, means at each generator for deriving a train of pulses from the oscillations generated thereat, and means at each generator for applying the derived pulses to unblock the corresponding connecting circuit in such a manner as to admit one of the said synchronising pulses during each cycle of the generated oscillations, for synchronising the said oscillations.

12. An arrangement according to claim 11 in which the oscillation frequency of the generators is substantially the same as the repetition frequency of the synchronizing pulses.

13. An arrangement according to claim 11, in which the frequency of at least one of the generators is substantially the same as a submultiple of the repetition frequency of the synchronizing pulses.

CHARLES WILLIAM EARP.

REFERENCES CITED

The following references are of record in the file of this patent:

UNITED STATES PATENTS

| Number | Name | Date |
|---|---|---|
| 1,754,882 | Clement | Apr. 15, 1930 |
| 1,854,432 | Thurston | Apr. 19, 1932 |
| 2,274,434 | Sheaffer | Feb. 24, 1942 |
| 2,277,000 | Bingley | Mar. 17, 1942 |
| 2,302,123 | Hepp et al. | Nov. 17, 1942 |
| 2,324,314 | Michel | July 13, 1943 |
| 2,348,016 | Michel | May 2, 1944 |
| 2,352,451 | Roemisch | June 27, 1944 |
| 2,376,395 | Skellett | May 22, 1945 |
| 2,419,570 | Labin et al. | Apr. 29, 1947 |
| 2,433,667 | Hollingsworth | Dec. 30, 1947 |